(12) United States Patent
Endo et al.

(10) Patent No.: US 7,843,536 B2
(45) Date of Patent: Nov. 30, 2010

(54) LIQUID CRYSTAL DISPLAY DEVICE AND PROJECTOR

(75) Inventors: Takashi Endo, Azumino (JP); Joji Karasawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 12/193,306

(22) Filed: Aug. 18, 2008

(65) Prior Publication Data

US 2009/0051857 A1 Feb. 26, 2009

(30) Foreign Application Priority Data

Aug. 22, 2007 (JP) ............................. 2007-215638

(51) Int. Cl.
*G02F 1/1335* (2006.01)
*C09K 19/02* (2006.01)
(52) U.S. Cl. .................... 349/117; 349/119; 349/177; 349/179; 349/186; 349/101
(58) Field of Classification Search ................ 349/101, 349/117, 177, 179, 186
See application file for complete search history.

(56) References Cited

U.S. PATENT DOCUMENTS 4,266,859 A * 5/1981 Togashi ...................... 349/177
5,479,282 A * 12/1995 Toko et al. .................. 349/123
5,499,126 A * 3/1996 Abileah et al. .............. 349/106

FOREIGN PATENT DOCUMENTS

JP    A 2004-198650    7/2004

* cited by examiner

*Primary Examiner*—David Nelms
*Assistant Examiner*—Mary A El Shammaa
(74) *Attorney, Agent, or Firm*—Oliff & Berridge, PLC

(57) ABSTRACT

A liquid crystal display device includes: a liquid crystal cell including liquid crystal operating in a twisted nematic mode; a first quartz plate optically compensating for the liquid crystal cell; a second quartz plate optically compensating for the liquid crystal cell; and a pair of polarizing elements disposed with the liquid crystal cell, the first quartz plate, and the second quartz plate interposed therebetween. Here, the thickness d [μm] of the first and second quartz plates, the polar angle θ [°] of the optical axis of the first and second quartz plates, and the cell gap CG [μm] of the liquid crystal cell satisfy the following conditional expressions:

$$0.7(16\cos^2\theta - 23.6\cos\theta + 14.6)(1+0.32(CG-3.0)) < d \quad (1)$$

$$d < 1.3(16\cos^2\theta - 23.6\cos\theta + 14.6)(1+0.32(CG-3.0)) \quad (2).$$

4 Claims, 9 Drawing Sheets

LIQUID CRYSTAL DISPLAY DEVICE AND PROJECTOR

BACKGROUND

1. Technical Field

The present invention relates to a liquid crystal display device for forming an image and a projector having the liquid crystal display device.

2. Related Art

In the past, liquid crystal projectors using a twisted-nematic liquid crystal panel were known in which two sheets of optical compensating elements formed of a sapphire plate having an optical axis parallel to a rubbing direction and tilted by a predetermined angle about an incidence surface are disposed between a liquid crystal panel and an incidence polarizing plate or an emission polarizing plate (see JP-A-2004-198650).

However, in order to determine the thickness of the optical compensating elements in the above-mentioned liquid crystal panel, it is necessary to know information such as how the liquid crystal molecules rise upright in an actual black display, what alignment distribution the light has, and what the polar angle of the optical axis of the optical compensating element is. Particularly, it can be obtained by simulation how the liquid crystal molecules rise upright, but it requires many parameters of the liquid crystal panel, such as a liquid crystal refractive index, a difference in refractive index, a pretilt angle, a twist angle, a cell gap, a dielectric constant, and a helical pitch. As a result, it is necessary to consider many parameters to determine the thickness of the optical compensating element and it is also necessary to repeat complex calculations even with a slight change in design.

When a sapphire plate is sued as the optical compensating element, the difference in refractive index from the quartz glass constituting the liquid crystal panel is greater than that of a quartz plate, thereby making it difficult to optically compensate for an obliquely incident light beam. Sapphire is more expensive than materials such as quartz, thereby increasing the cost for the optical compensating element. In addition, sapphire has hardness higher than the material such as quartz and it is difficult to process sapphire.

SUMMARY

An advantage of some aspects of the invention is that it provides a liquid crystal display device in which the thickness of an optical compensating element can be determined using a simple calculation even with a slight change in design and thus a relatively good viewing angle characteristic in contrast can be simply realized without sacrificing the cost or processability.

Another advantage of some aspects of the invention is that it provides a projector equipped with the liquid crystal display device.

According to an aspect of the invention, there is provided a liquid crystal display device including (a) a liquid crystal cell including liquid crystal operating in a twisted nematic mode, (b) a first quartz plate optically compensating for the liquid crystal cell, (c) a second quartz plate optically compensating for the liquid crystal cell, and (d) a pair of polarizing elements disposed with the liquid crystal cell, the first quartz plate, and the second quartz plate interposed therebetween. In the liquid crystal display device, (e) the thickness d [μm] of the first and second quartz plates, the polar angle θ [°] of the optical axis of the first and second quartz plates, and the cell gap CG [μm] of the liquid crystal cell satisfy Expression 1 and 2:

$$0.7(16\cos^2\theta - 23.6\cos\theta + 14.6)(1 + 0.32(CG-3.0)) < d \quad (1)$$

$$d < 1.3(16\cos^2\theta - 23.6\cos\theta + 14.6)(1 + 0.32(CG-3.0)) \quad (2).$$

In the liquid crystal display device, it is possible to simply determine the thickness d of the first and second quartz plates on the basis of the polar angle θ of the optical axis of the first and second quartz plates and the cell gap CG of the liquid crystal cell. Accordingly, it is possible to provide a liquid crystal display device having a good viewing angle characteristic in contrast, for example, in a black display state where the liquid crystal cell is turned on.

In the liquid crystal display device, when the polar angel of the optical axis of the first and second quartz plates is in the range of 45° to 65° and the cell gap of the liquid crystal cell is in the range of 2.5 to 3.5 μm, the thickness d of the first and second quartz plates may be in the range of 3.5 to 11.3 μm.

According to another aspect of the invention, there is provided a projector including (a) the liquid crystal display device for light modulation according to the above aspect, (b) a lighting device lighting the liquid crystal display device, and (c) a projection lens projecting an image formed by the liquid crystal display device.

Since the projector includes the above-mentioned liquid crystal display device and can be designed using a simple method, it is possible to provide a projector that can project an image with high quality by the use of a liquid crystal display device having a relatively good viewing angle characteristic.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
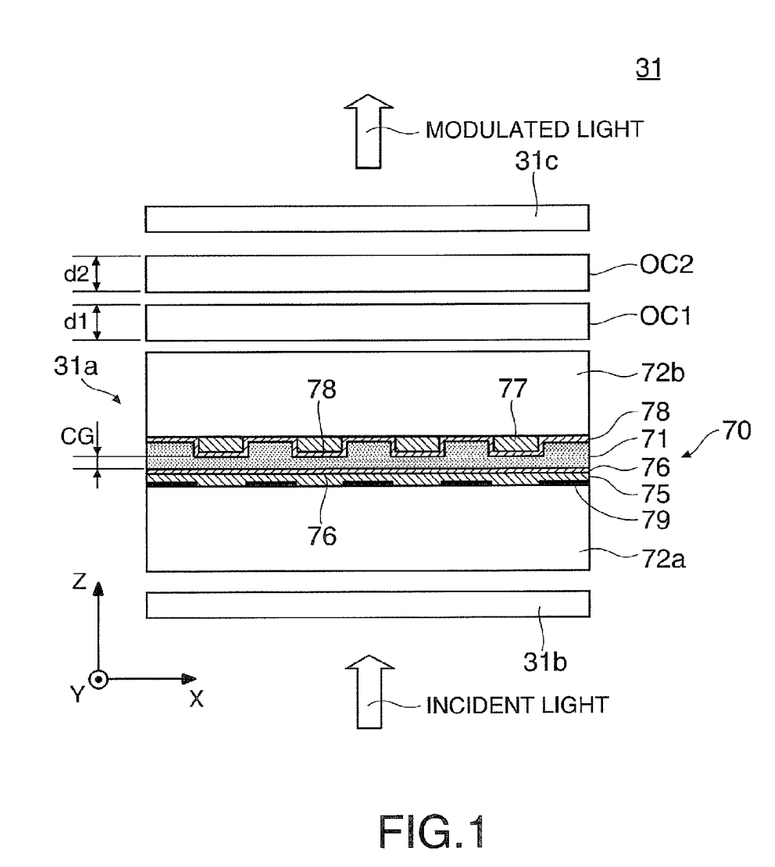
FIG. 1 is an enlarged sectional view illustrating a structure of a liquid crystal light valve according to a first embodiment of the invention.

FIG. 1 is an enlarged sectional view illustrating a structure of a liquid crystal light valve (light modulator) as a liquid crystal display device according to a first embodiment of the invention.

In a liquid crystal light valve 31 shown in the drawing, a first polarizing filter 31b which is an incidence-side polarizing element and a second polarizing filter 31c which is an emission-side polarizing element constitute, for example, a cross Nicol. A polarization modulating unit 31a interposed between the first and second polarizing filters 31b and 31c is a liquid crystal panel changing the polarization direction of incident light in the unit of pixels in accordance with an input signal.

The polarization modulating unit 31a includes a liquid crystal cell 70 having a first transparent substrate 72a close to the incidence side and a second transparent substrate 72b close to the emission side, which a liquid crystal layer 71 having liquid crystal operating in a twisted nematic mode (that is, twisted-nematic liquid crystal) is interposed between. The polarization modulating unit 31a includes a first optical compensating plate OC1 and a second optical compensating plate OC2 close to the second polarizing filter 31c of the liquid crystal cell 70. The substrates 72a and 72b and the optical compensating plates OC1 and OC2 all have a plate shape and normal lines of the incidence and emission surfaces are parallel to the Z axis, similarly to the polarizing filters 31b and 31c.

In the liquid crystal cell 70, a transparent common electrode 75 is disposed on the surface of the first substrate 72a close to the liquid crystal layer 71 and for example, an alignment film 76 is formed thereon. On the other hand, plural transparent pixel electrodes 77 arranged in a matrix and thin film transistors (not shown) electrically connected to the transparent pixel electrodes 77, respectively, are formed on the surface of the second substrate 72b close to the liquid crystal layer 71, and for example, an alignment film 78 is formed thereon. The liquid crystal cell 70 basically includes the first and second substrates 72a and 72b, the liquid crystal layer 71 interposed therebetween, and the electrodes 75 and 77 and serves as an active optical element changing the polarization state of the incident light in accordance with the input signal. Each pixel of the liquid crystal cell 70 includes a pixel electrode 77, a common electrode 75, and a liquid crystal layer 71 interposed therebetween. A lattice-like black matrix 79 is disposed between the first substrate 72a and the common electrode 75 so as to distinguish the pixels from each other.

The alignment films 76 and 78 serve to align liquid-crystal compounds constituting the liquid crystal layer 71 in a desired direction. One alignment film 76 aligns the liquid-crystal compounds close thereto in a first rubbing direction (for example, in the X axis direction) and the other alignment film 78 aligns the liquid-crystal compounds close thereto in a second rubbing direction (for example, in the Y axis direction). In an OFF state where a voltage is not applied to the liquid crystal layer 71, the alignment film 76 serves to align the optical axis of the liquid-crystal compounds in a direction including the XZ plane as a polarization plane of the first polarizing filter 31b and the alignment film 78 serves to align the optical axis of the liquid-crystal compounds in a direction including the YZ plane as a polarization plane of the second polarizing filter 31c. As a result, the optical axis of the liquid-crystal compounds in the liquid crystal layer 71 is slowly twisted from the first substrate 72a to the second substrate 72b. That is, the optical axes of a set of liquid-crystal compounds disposed inside the first and second substrates 72a and 72b, that is, on both ends of the liquid crystal layer 71 close to the alignment films 76 and 78, form a twist angle of 90° about each other when they are projected onto the XY plane. Accordingly, the liquid crystal layer 71 interposed between a pair of polarizing filters 31b and 31c can be made to operate in a normally white mode, thereby securing the maximum light-transmitting state (optical ON state) in the OFF state where a voltage is not applied. As described in detail later, at both ends of the liquid crystal layer 71, that is, the optical axes of the liquid-crystal compounds at positions close to the alignment films 76 and 78 are not parallel to the incidence surface or the emission surface opposed to the XY plane, that is, the alignment films 76 and 78, but are tilted about the incidence surface or the emission surface by a predetermined pretilt angle.

On the other hand, in the ON state where a voltage is applied to the liquid crystal layer 71, that is, in a light-blocked state (optical OFF state), the optical axes of the liquid-crystal compounds apart from the alignment films 76 and 78 are parallel to the normal line of the first substrate 72a (specifically, the Z axis direction). However, the optical axes of the liquid-crystal compounds at positions close to the alignment films 76 and 78 at both ends of the liquid crystal layer 71 are maintained substantially without any change. That is, the optical axes of the liquid-crystal compounds on both ends are aligned in the X direction or in the Y direction along the polarization planes of the first and second polarizing filters 31b and 31c, and are not parallel to the XY plane, that is, the incidence surface or the emission surface opposed to the alignment films 76 and 78 but are inclined about the incidence surface or the emission surface by a predetermined tilt angle or polar angle. In the OFF state where a voltage is not applied to the liquid crystal layer 71 and in the ON state where a voltage is applied thereto, the optical axes of the liquid-crystal compounds present close to the alignment films 76 and 78 are slightly changed but are maintained inclined about the XY plane. Accordingly, that is, when it is intended to optically compensate for the liquid crystal layer 71 in the ON state, that is, in the light-blocked state, the tilt angle corresponding to the inclined state is referred to as a pretilt angle.

The first optical compensating plate OC1 disposed on the emission side of the liquid crystal cell 70 is formed of a flat quartz plate which is an optical material having a positive single-axial refractive index, and may have a structure in which the quartz plate is supported by a flat glass plate but may have structure of a single quartz plate. The first quartz plate of the first optical compensating plate OC1 is disposed so that the optical axis thereof forms a constant angle about the YZ plane and the optical axis forms a predetermined tilted angle about the Z axis, that is, a predetermined polar angle. That is, the optical axis of the first quartz plate of the first optical compensating plate OC1 is parallel to the XZ plane and forms a predetermined polar angle about the Z axis. The thickness d1 of the first quartz plate is set to a value suitable for the optical compensation described later.

The second optical compensating plate OC2 is formed of a flat quartz plate and may have a structure in which the quartz plate is interposed and bonded between a pair of flat glass plates but may have a structure of a single flat quartz plate. The second quartz plate of the second optical compensating plate OC2 is disposed so that the optical axis thereof forms a constant angle about the XZ plane and the optical axis forms a predetermined tilted angle about the Z axis, that is, a predetermined polar angle. That is, the optical axis of the second quartz plate of the second optical compensating plate OC2 is parallel to the YZ plane and forms a predetermined polar angle about the Z axis. The thickness d2 of the second quartz plate is set to a value suitable for the optical compensation described later.

The first and second optical compensating plates OC1 and OC2 serve to compensate for the viewing angle dependency or the contrast deterioration due to the pretilt of the liquid crystal layer 71 in cooperation with each other. Specifically, the first quartz plate of the first optical compensating plate OC1 and the second quartz plate of the second optical compensating plate OC2 effectively cancel the liquid crystal obstruction due to the pretilt of the liquid crystal molecules present on both ends of the liquid crystal layer 71. Accordingly, at the time of manufacturing the first and second optical compensating plates OC1 and OC2, the azimuth angle or the polar angle of the optical axes of the first and second quartz plates is adjusted and the thicknesses d1 and d2 thereof are adjusted.

FIGS. 2A to 2D are perspective views conceptually illustrating the compensation of the pretilt (that is, compensation of the liquid crystal obstruction) using the first and second optical compensating plates OC1 and OC2.

Figure 2A:
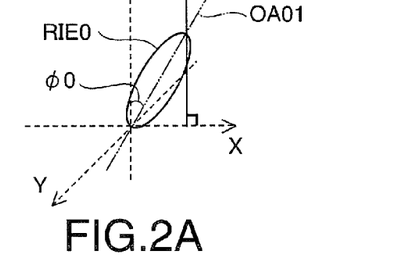
FIGS. 2A to 2D are diagrams illustrating the pretilt compensation of first and second compensating elements.

As shown in FIG. 2A, the average pretilt of the liquid crystal layer 71 close to the incidence surface is substantially parallel to the XZ plane and is tilted about the Z axis by an angle φ0. That is, in an index ellipsoid RIE0 having the pretilt, the optical axis OA01 is tilted about the Z axis by the polar angle φ0 and the optical axis OA01 is aligned substantially in the +X direction. At the position of the liquid crystal layer 71 close to the incidence surface, the optical axes of the liquid crystal compounds very close to the incidence surface are the same as the pretilt angle before application of a voltage thereto, and an angle thereof about the incidence surface is less than 10°. In addition, at the time of applying a voltage, as it goes to the center portion of the liquid crystal layer, the optical axes of the liquid-crystal compounds get abruptly close to an angle parallel to the normal direction of the incidence surface, that is, the Z axis direction.

Figure 2B:
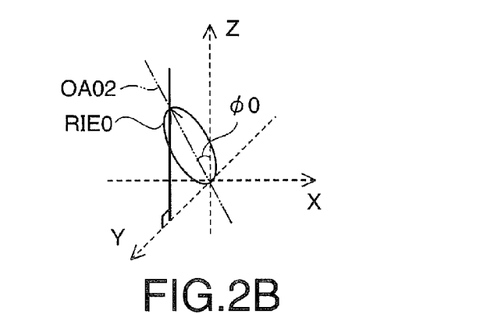

As shown in FIG. 2B, the average pretilt of the liquid crystal layer 71 close to the emission surface is substantially parallel to the YZ plane and is tilted about the Z axis by an angle φ0. That is, in an index ellipsoid RIE0 having the pretilt, the optical axis OA02 is tilted about the Z axis by the polar angle φ0 and the optical axis OA02 is aligned substantially in the +Y direction. At the position of the liquid crystal layer 71 close to the emission surface, the optical axes of the liquid crystal compounds very close to the incidence surface are the same as the pretilt angle before application of a voltage thereto, and an angle thereof about the incidence surface is less than 10°. In addition, at the time of applying a voltage, as it goes to the center portion of the liquid crystal layer, the optical axes of the liquid-crystal compounds get abruptly close to an angle parallel to the normal direction of the emission surface, that is, the Z axis direction.

Figure 2C:
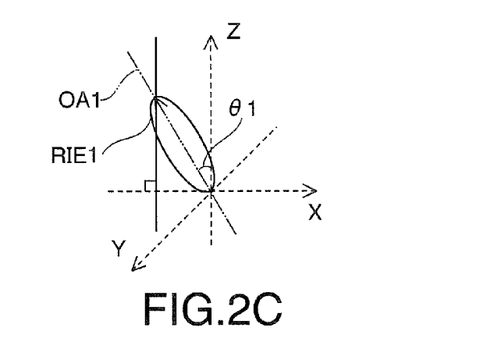
Figure 2D:
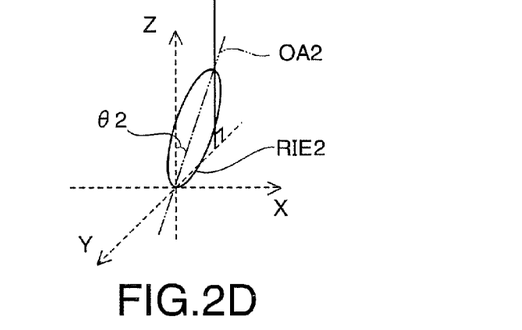

As shown in FIG. 2C, in the index ellipsoid RIE1 of the first quartz plate of the first optical compensating plate OC1, the optical axis OA1 is substantially parallel to the XZ plane and is tilted about the Z axis by the polar angle θ1. As shown in FIG. 2D, in the index ellipsoid RIE2 of the second quartz plate of the second optical compensating plate OC2, the optical axis OA2 is substantially parallel to the YZ plane and is tilted about the Z axis by the polar angle θ2.

Figure 3:
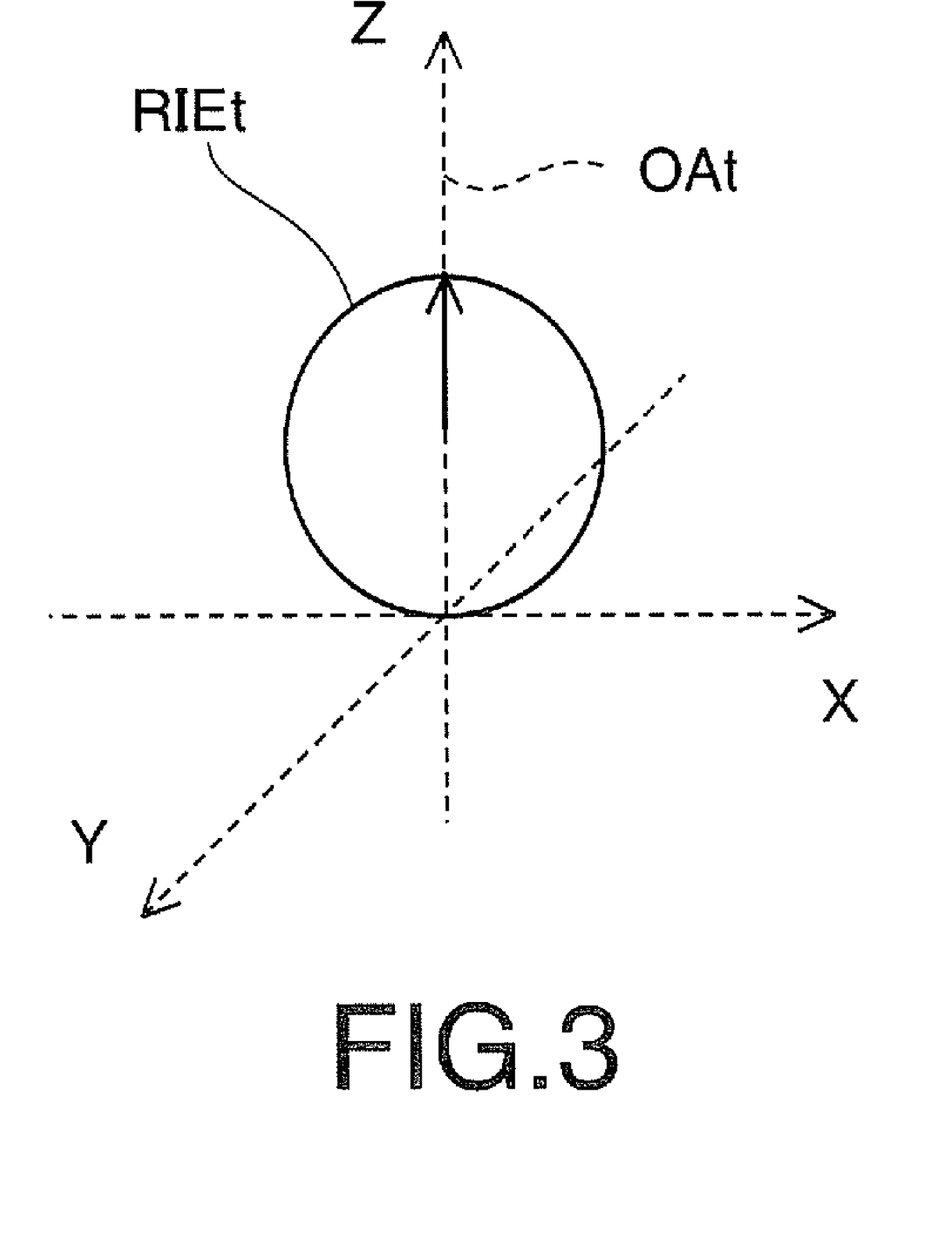
FIG. 3 is a diagram conceptually illustrating a compensation effect of the first and second compensating elements.

FIG. 3 is a diagram conceptually illustrating a compensation effect using the first and second optical compensating plates OC1 and OC2. In an index ellipsoid RIEt in which the pretilt close to the incidence surface and the emission surface of the liquid crystal layer 71 and the optical anisotropy of the first and second quartz plates of the optical compensating plates OC1 and OC2 are synthesized, the optical axis OAt thereof has a positive single-axis refractive index characteristic having a longitudinal diameter parallel to the Z axis. The index ellipsoid RIEt is a circular refractive index in the XY plane as viewed in the Z axis direction, and the liquid crystal obstruction of the light vertically incident on the liquid crystal layer 71 due to the pretilt of the liquid crystal layer 71 is compensated for. The dependency of the light obliquely incident on the liquid crystal layer 71 on the azimuth can be reduced, thereby suppressing the deterioration in viewing angle characteristic due to the liquid crystal obstruction.

A method of calculating designed values such as thicknesses of the first and second quartz plates of the first and second optical compensating plates OC1 and OC2 will be described now.

First, the thicknesses of the first and the second quartz plates making the characteristic of the liquid crystal light valve 31 better are calculated by the simulation under various conditions. Table 1 shows the simulation result.

TABLE 1

| | ID | | | | | | | | | |
|---|---|---|---|---|---|---|---|---|---|---|
| | 1 | 2 | 3 | 4 | 5 | 6 | 7 | 8 | 9 | 10 |
| θ [°] | 45 | 55 | 65 | 45 | 55 | 65 | 45 | 55 | 65 | 45 |
| CG [μm] | 2.5 | 2.5 | 2.5 | 3.0 | 3.0 | 3.0 | 3.5 | 3.5 | 3.5 | 2.5 |
| PT [°] | 6 | 6 | 6 | 6 | 6 | 6 | 6 | 6 | 6 | 10 |
| A | −55.7 | −61.3 | −38.4 | −30.3 | −35.1 | −44.3 | −28.6 | −38.0 | −24.9 | −53.3 |
| B | 553.4 | 646.4 | 491.0 | 365.8 | 450.3 | 676.2 | 404.8 | 573.8 | 438.2 | 522.0 |
| C | −162 | −363 | −196 | −32.5 | −233 | −1250 | −511 | −1090 | −803 | 100.5 |
| dp [μm] | 5.0 | 5.3 | 6.4 | 6.0 | 6.4 | 7.6 | 7.1 | 7.5 | 8.8 | 4.9 |
| Allowable value | 1213 | 1340 | 1373 | 1072 | 1210 | 1328 | 921 | 1074 | 1101 | 1378 |
| | 1091 | 1206 | 1236 | 965 | 1089 | 1195 | 828 | 967 | 991 | 1240 |
| | 6.4 | 6.8 | 8.3 | 7.9 | 8.3 | 9.4 | 8.9 | 9.2 | 10.9 | 6.5 |
| | 3.5 | 3.8 | 4.5 | 4.2 | 4.6 | 5.9 | 5.3 | 5.9 | 6.7 | 3.3 |
| | 130% | 128% | 130% | 131% | 129% | 123% | 125% | 122% | 124% | 133% |
| | 70% | 72% | 70% | 69% | 71% | 77% | 75% | 78% | 76% | 67% |

| | ID | | | | | | | | | |
|---|---|---|---|---|---|---|---|---|---|---|
| | 11 | 12 | 13 | 14 | 15 | 16 | 17 | 18 | 19 | 20 |
| θ [°] | 55 | 65 | 45 | 55 | 65 | 45 | 55 | 65 | 45 | 55 |
| CG [μm] | 2.5 | 2.5 | 3.0 | 3.0 | 3.0 | 3.5 | 3.5 | 3.5 | 2.5 | 2.5 |
| PT [°] | 10 | 10 | 10 | 10 | 10 | 10 | 10 | 10 | 14 | 14 |
| A | −60.5 | −36.9 | −29.2 | −34.1 | −26.1 | −21.2 | −22.4 | −25.5 | −50.9 | −59.6 |
| B | 627.8 | 464.9 | 347.7 | 430.9 | 383.7 | 283.4 | 322.0 | 438.1 | 490.3 | 608.5 |
| C | −323 | −133 | 14.25 | −179 | −181 | −61.9 | −164 | −802 | −47.7 | −289 |
| dp [μm] | 5.2 | 6.3 | 5.9 | 6.3 | 7.4 | 6.7 | 7.2 | 8.6 | 4.8 | 5.1 |

TABLE 1-continued

| Allowable value | 1306 | 1330 | 1048 | 1181 | 1231 | 887 | 995 | 1082 | 1133 | 1263 |
|---|---|---|---|---|---|---|---|---|---|---|
| | 1175 | 1197 | 943 | 1063 | 1108 | 799 | 895 | 974 | 1020 | 1136 |
| | 6.7 | 8.2 | 7.8 | 8.2 | 9.5 | 8.7 | 9.3 | 10.7 | 6.3 | 6.6 |
| | 3.7 | 4.4 | 4.1 | 4.5 | 5.2 | 4.7 | 5.1 | 6.5 | 3.3 | 3.6 |
| | 128% | 130% | 132% | 129% | 130% | 131% | 129% | 124% | 131% | 129% |
| | 72% | 70% | 68% | 71% | 70% | 69% | 71% | 76% | 69% | 71% |

| | | ID | | | | | | |
|---|---|---|---|---|---|---|---|---|
| | | 21 | 22 | 23 | 24 | 25 | 26 | 27 |
| | θ [°] | 65 | 45 | 55 | 65 | 45 | 55 | 65 |
| | CG [μm] | 2.5 | 3.0 | 3.0 | 3.0 | 3.5 | 3.5 | 3.5 |
| | PT [°] | 14 | 14 | 14 | 14 | 14 | 14 | 14 |
| | A | −34.9 | −27.8 | −32.8 | −26.1 | −21.1 | −34.8 | −25.7 |
| | B | 433.3 | 325.2 | 406.9 | 375.1 | 277.1 | 507.3 | 431.6 |
| | C | −68.3 | 64.57 | −121 | −153 | −36.5 | −831 | −754 |
| | dp [μm] | 6.2 | 5.8 | 6.2 | 7.2 | 6.6 | 7.3 | 8.4 |
| | Allowable | 1275 | 1015 | 1143 | 1197 | 874 | 1019 | 1059 |
| | value | 1147 | 914 | 1029 | 1077 | 767 | 917 | 953 |
| | | 8.1 | 7.8 | 8.1 | 9.3 | 8.6 | 9.0 | 10.4 |
| | | 4.3 | 3.9 | 4.3 | 5.1 | 4.5 | 5.6 | 6.4 |
| | | 131% | 133% | 130% | 130% | 131% | 123% | 124% |
| | | 69% | 67% | 70% | 70% | 69% | 77% | 76% |

Here, ID represents a simulation number performed while changing the designed values of the liquid crystal light valve 31, θ [°] represents the polar angle of the optical axis of the quartz plate, CG [μm] represents the cell gap of the liquid crystal cell 70, PT [°] represents the pretilt angle φ on the incidence side or the emission side of the liquid crystal cell 70, A, B, and C represents fitting coefficients, dp [μm] represents the optimal thicknesses of the first and second quartz plates. The allowable values represent sequentially from the top the maximum contrast value including the viewing angle dependence, the contrast value corresponding to 80% of the maximum value, the maximum allowable thickness of the quartz plate corresponding to the 80% contrast, the minimum allowable thickness of the quartz plate corresponding to the 80% contrast, the ratio [%] of the maximum allowable thickness to the optimal thickness dp, and the ratio [%] of the minimum allowable thickness to the optimal thickness dp. The polar angle θ of the quartz plate is in the range of 45° to 55° which is generally used in the liquid crystal light valve 31, the cell gap CG of the liquid crystal cell 70 is in the range of 2.5 to 3.5 μm which is generally used in the liquid crystal cell 70, and the pretilt angle φ is in the range of 6° to 14° which is generally used in the liquid crystal cell 70. The optimal thickness dp corresponds to d1 (=d2) of FIG. 1 and the polar angle θ of the optical axis of the quartz plate corresponds to the polar angle θ1 (=θ2) in FIGS. 2C and 2D. The 80% contrast is an error allowable as a catalog value of the liquid crystal light valve 31.

Figure 4:
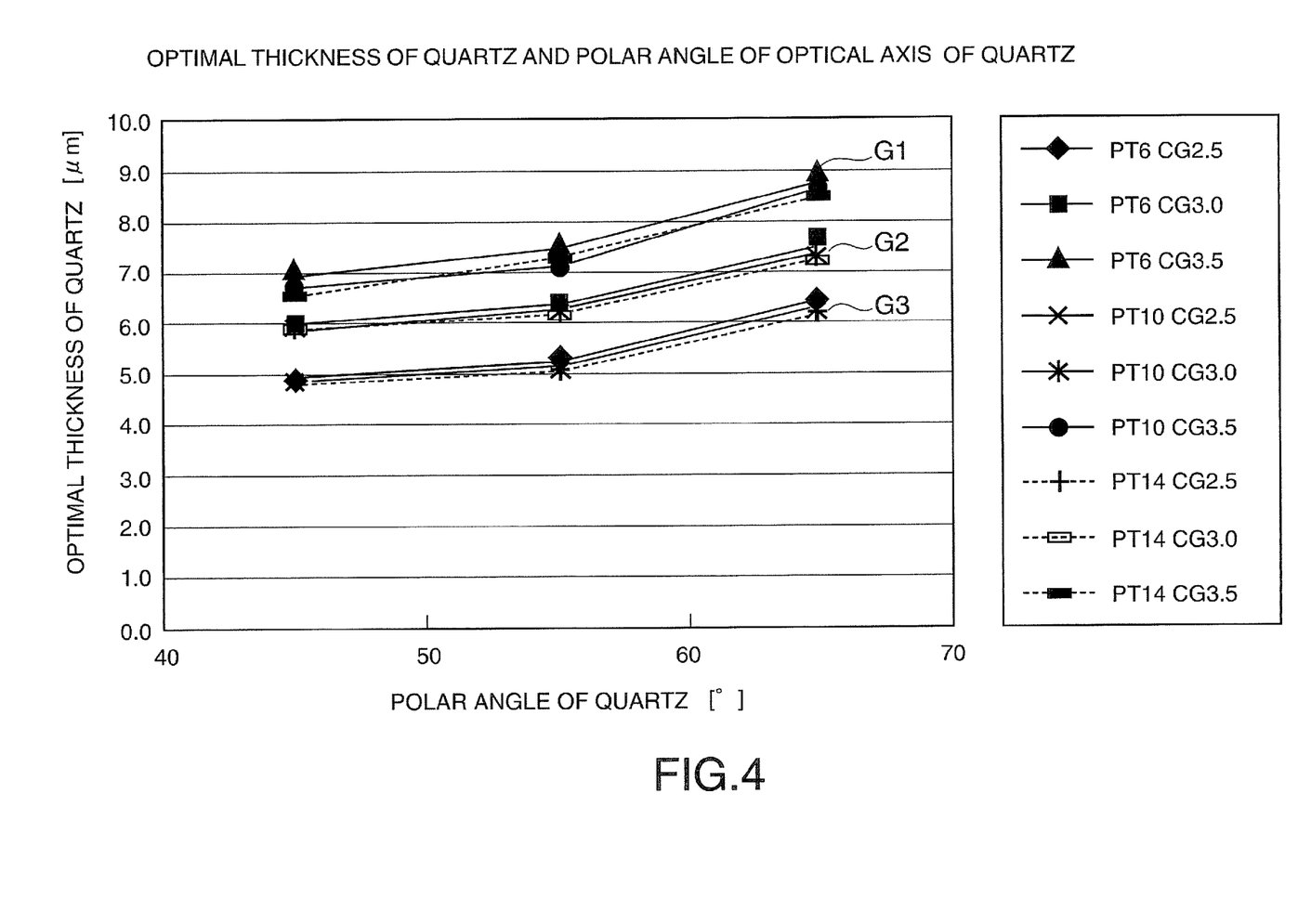
FIG. 4 is a graph illustrating a relation between a polar angle of a quartz plate and the optimal thickness of the quartz plate.

FIG. 4 shows a re-arrangement of Table 1 and is a graph illustrating a relation between the polar angle θ of the quartz plate and the optimal thickness dp of the quartz plate. Referring to the graph, the horizontal axis represents the polar angle θ of the quartz plate and the vertical axis represents the optimal thickness d of the quartz plate. In the graph, the liquid crystal light valve 31 in simulation is classified into three groups G1, G2, and G3. The groups G1, G2, and G3 are classified depending on the cell gap CG and the dependency of the optimal thickness dp on the polar angle θ is common in each of the groups G1, G2, and G3. Accordingly, it can be seen that the optimal thickness dp of the quartz plate mainly depends on the cell gap CG and the polar angle θ of the quartz plate and is hardly influenced by the pretilt angle φ of the liquid crystal cell 70.

An approximate expression for determining the desirable thickness d (=d1 and d2) of the quartz plate on the basis of the polar angle θ of the optical axis of the quartz plate and the cell gap CG of the liquid crystal cell 70 will be described now.

First, the standard value or the reference value of the thickness d of the quartz plate in the known liquid crystal light valve 31 is determined. At this time, the average value of the optimal thicknesses dp is calculated when the cell gap CG is a middle value of 3.0 μm and the polar angle θ of the quartz plate is a middle value of 55°. Specifically, the reference thickness of 6.31 μm is obtained as the average value of the optimal thicknesses dp of ID5, ID14, and ID23 in Table 1.

A method of calculating the optimal thickness dp of the quartz plate from the polar angle θ of the optical axis of the quartz plate will be described now. Here, the optimal thicknesses dp are listed in Table 2 in the unit of groups having the same cell gap CG such as ID1 to ID3, ID4 to ID6, ID7 to ID9, ID10 to ID12, ID1 to ID15, ID16 to ID18, ID19 to ID21, ID22 to ID24, and ID25 to ID27 and differences of the optimal thicknesses dp about the polar angle θ=55° are listed in Table 3.

TABLE 2

| | Polar angle of quartz | | |
|---|---|---|---|
| | 45° | 55° | 65° |
| ID1 to ID3 | 5.0 | 5.3 | 6.4 |
| ID4 to ID6 | 6.0 | 6.4 | 7.6 |
| ID7 to ID9 | 7.1 | 7.5 | 8.8 |
| ID10 to ID12 | 4.9 | 5.2 | 6.3 |
| ID13 to ID15 | 5.9 | 6.3 | 7.4 |
| ID16 to ID18 | 6.7 | 7.2 | 8.6 |
| ID19 to ID21 | 4.8 | 5.1 | 6.2 |
| ID22 to ID24 | 5.8 | 6.2 | 7.2 |
| ID25 to ID27 | 6.6 | 7.3 | 8.4 |

TABLE 3

|  | Polar angle of quartz | | |
| --- | --- | --- | --- |
|  | 45° | 55° | 65° |
| ID1 to ID3 | −0.3 | 0.0 | 1.1 |
| ID4 to ID6 | −0.4 | 0.0 | 1.2 |
| ID7 to ID9 | −0.5 | 0.0 | 1.3 |
| ID10 to ID12 | −0.3 | 0.0 | 1.1 |
| ID13 to ID15 | −0.4 | 0.0 | 1.0 |
| ID16 to ID18 | −0.5 | 0.0 | 1.4 |
| ID19 to ID21 | −0.3 | 0.0 | 1.1 |
| ID22 to ID24 | −0.4 | 0.0 | 1.0 |
| ID25 to ID27 | −0.7 | 0.0 | 1.1 |
| Average | −0.4 | 0.0 | 1.2 |

Figure 5:
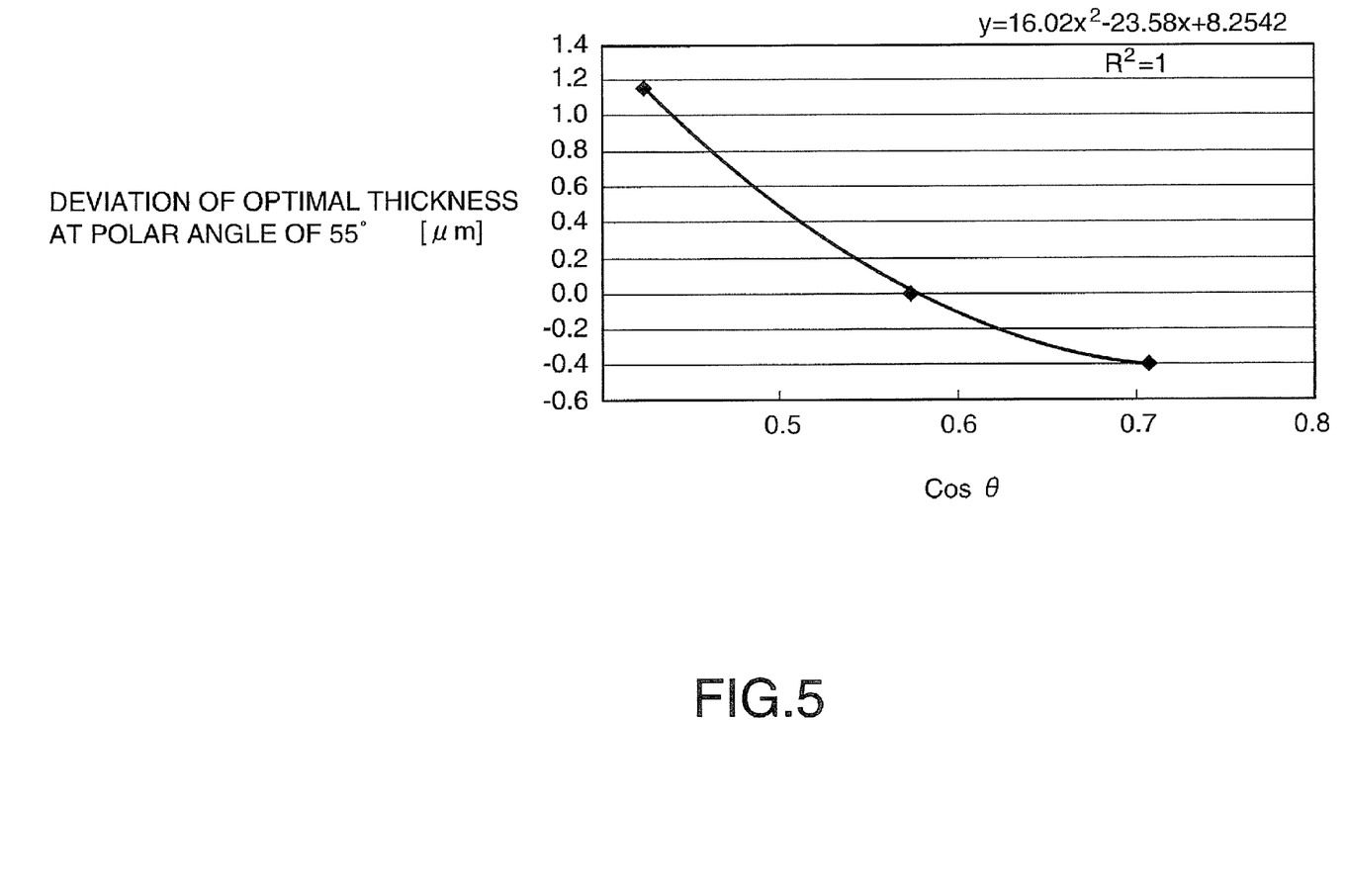
FIG. 5 is a graph illustrating a relation between the cosine of the polar angle of the optical axis of the quartz plate and the optimal thickness of the quartz plate.

As a result, the average difference of the optimal thicknesses dp from the reference thickness at the polar angle $\theta=45°$ is $-0.4$ μm and the average difference of the optimal thicknesses dp at the polar angle $\theta=65°$ is $+1.2$ μm. From the above description, an expression for approximately determining the optimal thicknesses dp of the quartz plates while changing the polar angles $\theta$ of the quartz plates is obtained. FIG. 5 is a diagram illustrating a relation between a cosine of the polar angles $\theta$ of the optical axes of the quartz plates and the optimal thicknesses dp of the quartz plates. In the graph, the horizontal axis represents $\cos\theta$ and the vertical axis represents a difference of the optimal thicknesses dp at the polar angle $\theta=55°$, that is, a deviation y. Here, cos 45° is 0.71, cos 55° is 0.57, and cos 65° is 0.42. Expression 3 is obtained by fitting to enable the secondary approximation.

$$Y = 16\cos^2\theta - 23.6\cos\theta + 8.25 \quad (3)$$

Here, by considering that the reference thickness of the quartz plate is 6.31 μm when the cell gap CG is 3.0 μm and the polar angle $\theta$ is 55°, the approximated optimal thickness dp' is expressed by Expression 4, where the cell gap CG is 3.0 μm.

$$dp' = 16\cos^2\theta - 23.6\cos\theta + 14.6 = 6.31 \quad (4)$$

A method of calculating the approximated optimal thickness dp' of the quartz plate from the cell gap CG of the liquid crystal cell 70 will be described now. Table 4 shows the differences of the optimal thicknesses dp with respect to the cell gap CG=3.0 μm. Table 5 shows variation rates of the optimal thicknesses dp to the variation of the cell gap CG with respect to the cell gap CG=3.0 μm. Here, ID4 to ID6, ID13 to ID15, ID16 to ID18, and ID22 to ID24 are based on the cell gap CG=3.0 μm.

TABLE 4

|  | Polar angle of quartz | | |
| --- | --- | --- | --- |
|  | 45° | 55° | 65° |
| ID1 to ID3 | −1.07 | −1.13 | −1.24 |
| ID4 to ID6 | 0.0 | 0.0 | 0.0 |
| ID7 to ID9 | 1.03 | 1.14 | 1.19 |
| ID10 to ID12 | −1.05 | −1.12 | −1.06 |
| ID13 to ID15 | 0.0 | 0.0 | 0.0 |
| ID16 to ID18 | 0.75 | 0.89 | 1.24 |
| ID19 to ID21 | −1.03 | −1.11 | −1.00 |
| ID22 to ID24 | 0.0 | 0.0 | 0.0 |
| ID25 to ID27 | 0.73 | 1.08 | 1.21 |

Variation with respect to CG=3.0

TABLE 5

|  | Polar angle of quartz | | |
| --- | --- | --- | --- |
|  | 45° | 55° | 65° |
| ID1 to ID3 | −0.18 | −0.18 | −0.16 |
| ID4 to ID6 | — | — | — |
| ID7 to ID9 | 0.17 | 0.18 | 0.16 |
| ID10 to ID12 | −0.18 | −0.18 | −0.14 |
| ID13 to ID15 | — | — | — |
| ID16 to ID18 | 0.13 | 0.14 | 0.17 |
| ID19 to ID21 | −0.18 | −0.18 | −0.14 |
| ID22 to ID24 | — | — | — |
| ID25 to ID27 | 0.12 | 0.17 | 0.17 |

Variation with respect to CG=3.0
16%

As a result, the average variation rate of the optimal thickness dp when the cell gap varies in the range of 3.0±0.5 μm with respect to the cell gap CG=3.0 μm is 16%. That is, when the cell gap CG varies by 1 μm, the optimal thickness dp of the quartz plate varies by 32%. Accordingly, the proportionality coefficient $\alpha$ in consideration of the cell gap CG is approximated by Expression 5.

$$\alpha = 1 + 0.32(CG - 3.0) \quad (5)$$

Accordingly, the approximated optimal thickness dp' of the quartz plate is expressed by Expression 6, by multiplying the value of Expression 4 by the proportional coefficient $\alpha$ of Expression 5.

$$dp' = (16\cos^2\theta - 23.6\cos\theta + 14.6)(1 + 0.32(CG - 3.0)) \quad (6)$$

Expression 6 is used to approximately calculate the optimal thickness dp' on the basis of the polar angle $\theta$ of the optical axis of the quartz plate and the cell gap CG.

Table 6 shows the calculation result of the approximated optimal thickness dp' of the quartz plate using Expression 6.

TABLE 6

| | ID | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| θ [°] | 45 | 55 | 65 | 45 | 55 | 65 | 45 | 55 | 65 | 45 | 55 | 65 | 45 | 55 |
| CG [μm] | 2.5 | 2.5 | 2.5 | 3.0 | 3.0 | 3.0 | 3.5 | 3.5 | 3.5 | 2.5 | 2.5 | 2.5 | 3.0 | 3.0 |
| PT [°] | 6 | 6 | 6 | 6 | 6 | 6 | 6 | 6 | 6 | 10 | 10 | 10 | 10 | 10 |
| dp [μm] | 5.0 | 5.3 | 6.4 | 6.0 | 6.4 | 7.6 | 7.1 | 7.5 | 8.8 | 4.9 | 5.2 | 6.3 | 5.9 | 6.3 |
| dp' | 5.0 | 5.3 | 6.3 | 5.9 | 6.3 | 7.5 | 6.9 | 7.3 | 8.7 | 5.0 | 5.3 | 6.3 | 5.9 | 6.3 |
| difference | 0.00 | −0.04 | 0.10 | 0.13 | 0.08 | 0.14 | 0.22 | 0.21 | 0.13 | −0.07 | −0.13 | 0.01 | 0.03 | −0.02 |

| | ID | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| θ [°] | 65 | 45 | 55 | 65 | 45 | 55 | 65 | 45 | 55 | 65 | 45 | 55 | 65 |
| CG [μm] | 3.0 | 3.5 | 3.5 | 3.5 | 2.5 | 2.5 | 2.5 | 3.0 | 3.0 | 3.0 | 3.5 | 3.5 | 3.5 |
| PT [°] | 10 | 10 | 10 | 10 | 14 | 14 | 14 | 14 | 14 | 14 | 14 | 14 | 14 |
| dp [μm] | 7.4 | 6.7 | 7.2 | 8.6 | 4.8 | 5.1 | 6.2 | 5.8 | 6.2 | 7.2 | 6.6 | 7.3 | 8.4 |
| dp' | 7.5 | 6.9 | 5.3 | 7.3 | 8.7 | 5.0 | 6.3 | 5.9 | 6.3 | 7.5 | 6.9 | 7.3 | 8.7 |
| difference | −0.12 | −0.16 | −0.14 | −0.08 | −0.15 | −0.21 | −0.09 | −0.07 | −0.12 | −0.29 | −0.29 | −0.05 | −0.28 | 0.22 |

By comparing the optimal thickness dp' of Table 6 with the optimal thickness dp of Table 1, it can be seen that both are relatively well matched with each other.

The allowable range of the thickness d of the quartz plate including the error of the approximated optimal thickness dp' will be reviewed now. When the 80% contrast of the contrast employing the quartz plate with the optimal thickness d can be obtained, it is determined that good contrast is obtained. As shown in Table 1, the ratio of the maximum allowable thickness and the minimum allowable thickness of the quartz plate corresponding to the 80% contrast to the optimal thickness dp is ±30%. Accordingly, the thickness d of the quartz plate for realizing the 80% contrast is in the range of 0.7×dp'<d<1.3× dp' obtained by Expression 6 and satisfies both of Expressions 1 and 2.

$$0.7(16\cos^2\theta - 23.6\cos\theta + 14.6)(1 + 0.32(CG - 3.0)) < d \quad (1)$$

$$d < 1.3(16\cos^2\theta - 23.6\cos\theta + 14.6)(1 + 0.32(CG - 3.0)) \quad (2)$$

Specifically, when the polar angle θ of the optical axis of the quartz plate is in the range of 45° to 65° and the cell gap of the liquid crystal cell 70 is in the range of 2.5 to 3.5 μm, the thickness d of the quartz plate shown in Table 6 has 70% of the minimum value 50 as the lower limit and 130% of the maximum 8.7 shown in Table 6 as the upper limit, and is in the range of 3.5 to 11.3 μm.

In the actual liquid crystal cell 70, when the cell gap CG is 3.0 μm and the polar angle θ is 55°, the thickness d of a single quartz plate satisfying Expressions 1 and 2 is in the range of 4.5 μm to 8.2 μm by substitution of specific numerical values. The relation between the thickness d of the quartz plate and the contrast is checked by simulation on the premise of the above-mentioned CG and θ. Table 7 shows the contrast simulation result of the liquid crystal light valve 31.

TABLE 7

| | Quartz thickness [μm] | | | | | | | | |
|---|---|---|---|---|---|---|---|---|---|
| | 0 | 2 | 4 | 6 | 8 | 10 | 15 | 20 | 30 |
| Contrast | 574 | 891 | 1339 | 1727 | 1596 | 1129 | 420 | 202 | 84 |

Figure 6:
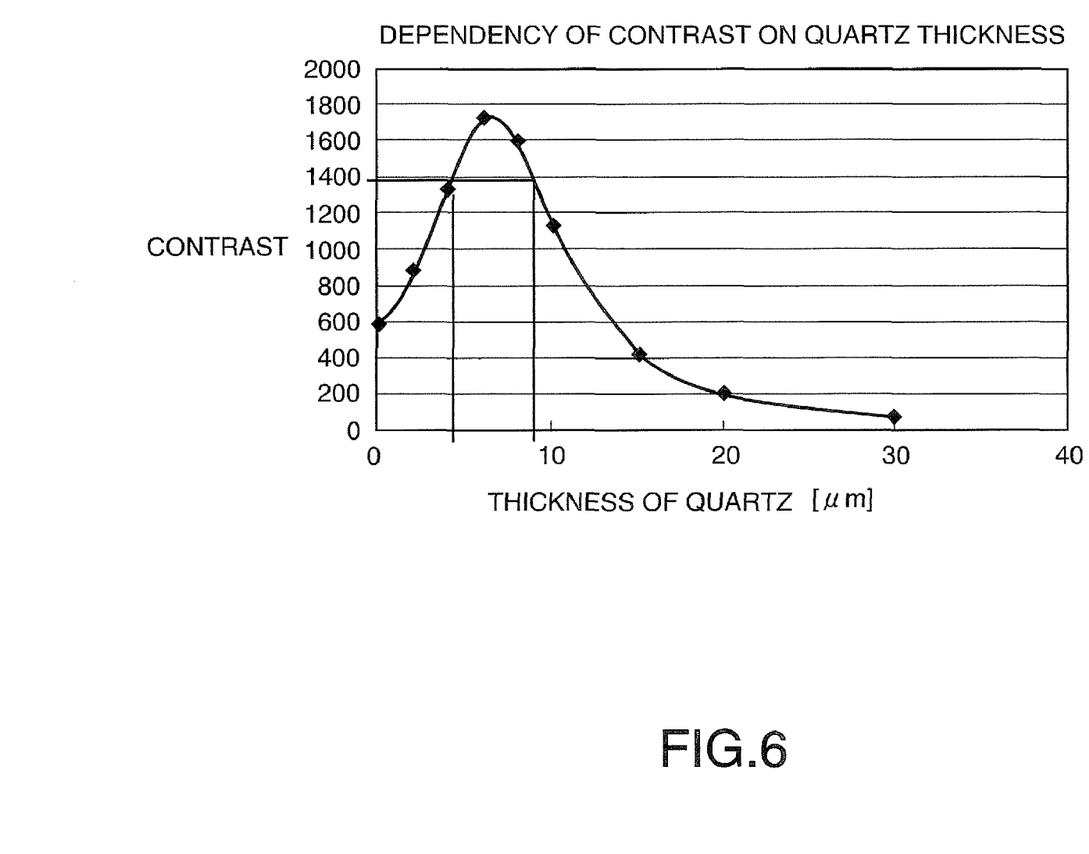
FIG. 6 is a diagram illustrating a contrast simulation result of the liquid crystal light valve.

The pretilt angle of the liquid crystal cell 70 has a small influence and thus is set to the range of 6° to 14°. Similarly, the conventional values of the parameters such as the refractive index, the twist angle, the dielectric constant, and the helical pitch of the liquid crystal cell 70 are used in the calculation. FIG. 6 is a graph of Table 7, where the horizontal axis represents the thickness d of the quartz plate and the vertical axis represents the contrast of the liquid crystal light valve 31. As can be clearly seen from the graph, the thickness d of a single quartz plate providing the 80% contrast of the maximum contrast is in the range of 4.5 to 8.2 μm and satisfies both of Expressions 1 and 2. Accordingly, by using the quartz plate having the thickness satisfying both of Expressions 1 and 2, it can be determined that the 80% contrast of the maximum contrast is obtained.

As can be seen from the above description, in the liquid crystal display device according to the first embodiment or the manufacturing method thereof, it is possible to simply determine the thicknesses d of the first and second quartz plates on the basis of the polar angles θ of the first and second quartz plates corresponding to the first and second optical compensating plates OC1 and OC2 and the cell gap CG of the liquid crystal cell 70. Accordingly, for example, in the black display state of the liquid crystal cell 70 in the ON state, it is possible to simply manufacture the liquid crystal light valve 31 having a good viewing angle characteristic with respect to the contrast.

Second Embodiment

Figure 7:
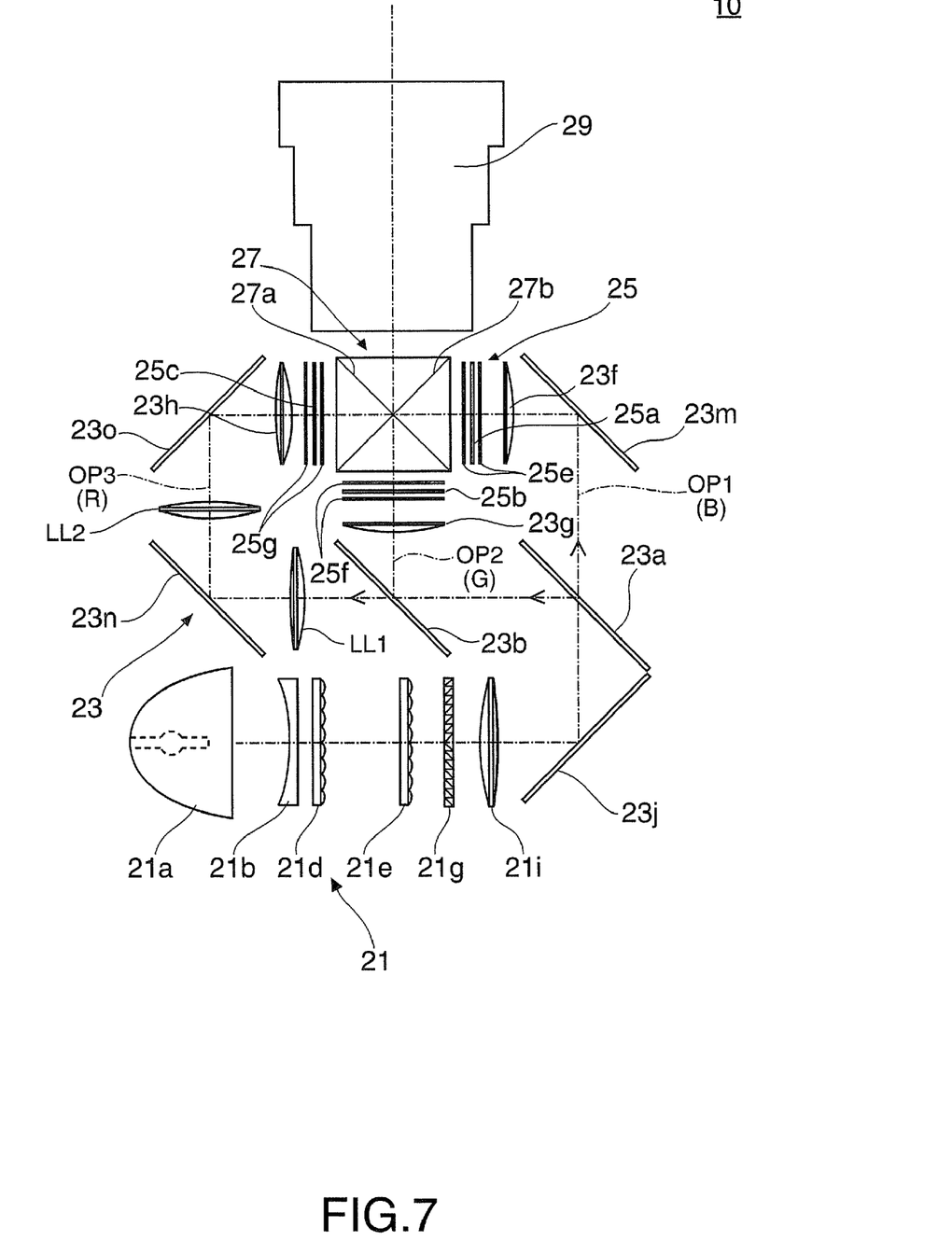
FIG. 7 is a diagram illustrating an optical system of a projector equipped with the liquid crystal light valve shown in FIG. 1.

FIG. 7 is a diagram illustrating a configuration of an optical system of a projector equipped with the liquid crystal light valve 31 shown in FIG. 1.

The projector 10 includes a light source unit 21 generating a source light beam, a color-separating optical system 23 separating the source light beam from the light source unit 21 into three-color beams of red, green, and blue, a light modulating unit 25 receiving the color beams emitted from the color-separating optical system 23, a cross dichroic prism 27 synthesizing the color beams from the light modulating unit 25, and a projection lens 29 as a projection optical system projecting an image beam from the cross dichroic prism 27 onto a screen (not shown). The light source unit 21, the color-separating optical system 23, the light modulating unit 25, and the cross dichroic prism 27 constitute an image forming apparatus forming an image beam to be projected onto the screen.

In the projector 10, the light source unit 21 includes a light source lamp 21a, a concave lens 21b, a pair of lens arrays 21d and 21e, a polarization converting member 21g, and an overlap lens 21i. The light source lamp 21a is formed of, for example, a high-pressure mercury lamp and includes a concave mirror collecting and emitting the source light beam forward. The concave lens 21b serves to collimate the source light beam from the light source lamp 21a and may be omitted. The pair of lens arrays 21d and 21e includes plural element lenses arranged in a matrix and serve to split the source light beam from the light source lamp 21a through the concave lens 21b and to concentrate and emit the split beams. The polarization converting member 21g converts the source light beam emitted from the lens array 21e into only an S polarization component perpendicular to the paper surface of FIG. 7 and supplies the converted beam to the next-stage optical system. The overlap lens 21i enables the overlapping lighting of color light modulators of the light modulating unit 25 by properly collecting the beams passing through the polarization converting member 21g as a whole. That is, the light beam passing through both lens arrays 21d and 21e and the overlap lens 21i uniformly lights the color liquid crystal panels 25a, 25b, and 25c of the light modulating unit 25 through the color-separating optical system 23 described in detail later.

The color-separating optical system 23 includes first and second dichroic mirrors 23a and 23b, three field lenses 23f, 23g, and 23h as an optical compensating system, reflecting mirrors 23j, 23m, 23n, and 23o, and constitutes a lighting device along with the light source unit 21. Here, the first dichroic mirror 23a reflects, for example, red and green beams of three color beams of red, green, and blue and transmits a blue beam. The second dichroic mirror 23b reflects, for example, the green beam of the red and green beams incident thereon and transmits the red beam. In the color-separating optical system 23, the source light beam of white from the light source unit 21 is bent in optical path by the reflecting mirror 23j and is then incident on the first dichroic mirror 23a. The blue beam having passed through the first dichroic mirror 23a is incident on the field lens 23f through the reflecting mirror 23m with the S polarization unchanged. The green beam reflected by the first dichroic mirror 23a and reflected again by the second dichroic mirror 23b is incident on the field lens 23g with the S polarization unchanged. The red beam having passed through the second dichroic mirror 23b is incident on the field lens 23h adjusting the incidence angle through the lenses LL1 and LL2 and the reflecting mirrors 23n and 23o with the S polarization unchanged. The lenses LL1 and LL2 and the field lens 23h constitute a relay optical system. The relay optical system serves to transmit the image of the first lens LL1 to the field lens 23h through the second lens LL2 almost without any change.

The light modulating unit 25 includes three liquid crystal panels 25a, 25b, and 25c and three sets of polarizing filters 25e, 25f, and 25g disposed with the liquid crystal panels 25a, 25b, and 25c interposed therebetween. Here, the blue liquid crystal panel 25a disposed in a first optical path OP1 and the pair of polarizing filters 25e and 25e with the blue liquid crystal panel interposed therebetween constitute a blue liquid crystal light valve modulating two-dimensionally the brightness of the blue beam on the basis of the image information. The blue liquid crystal light valve has the same structure as the liquid crystal light valve 31 shown in FIG. 1 and is equipped with the first and second optical compensating plates OC1 and OC2 for enhancing the contrast. Similarly, the green liquid crystal panel 25b disposed in a second optical path OP2 and the corresponding polarizing filters 25f and 25f constitute a green liquid crystal light valve. The red liquid crystal panel 25c disposed in a third optical path OP3 and the corresponding polarizing filters 25g and 25g constitute a red liquid crystal light valve. The green and red liquid crystal light valves have the same structure as the liquid crystal light valve 31 shown in FIG. 1.

The blue beam separated by passing through the first dichroic mirror 23a of the color-separating optical system 23 is incident on the first liquid crystal panel 25a for blue through the field lens 23f. The green beam separated by passing through the second dichroic mirror 23b of the color-separating optical system 23 is incident on the second liquid crystal panel 25b for green through the field lens 23g. The red beam separated by passing through the second dichroic mirror 23b of the color-separating optical system 23 is incident on the third liquid crystal panel 25c for red through the field lens 23h. The liquid crystal panels 25a to 25c are light-non-emitting light modulators modulating the spatial intensity distribution of the incident light in the unit of pixels. The three-color beams incident on the liquid crystal panels 25a to 25c, respectively, are modulated in accordance with a driving signal or an image signal input as an electrical signal to the liquid crystal panels 25a to 25c. At this time, the polarization directions of the beams incident on the liquid crystal panels 25a to 25c are adjusted by the polarizing filters 25e, 25f, and 25g, and component beams having a predetermined polarization direction are taken out as image beams from the modulated beams emitted from the liquid crystal panels 25a to 25c.

The cross dichroic prism 27 is a light synthesizing member and has a substantially square shape in a plan view obtained by bonding four rectangular prisms to each other, and a pair of multi-layer dielectric films 27a and 27b crossing each other in the X shape is formed in the bonding boundaries between the rectangular prisms. The first multi-layer dielectric film 27a reflects the blue beam and the second multi-layer dielectric film 27b reflects the red beam. The cross dichroic prism 27 reflects the blue beam from the liquid crystal panel 25a by the use of the first multi-layer dielectric film 27a to emit the blue beam to the right in the traveling direction, transmits and emits the green beam from the liquid crystal panel 25b through the first and second multi-layer dielectric films 27a and 27b, and reflects the red beam from the liquid crystal panel 25c by the use of the second multilayer dielectric film 27b to emit the red beam to the left in the traveling direction.

The projection lens 29 projects a color image beam synthesized by the cross dichroic prism 27 onto a screen (not shown) by a desired magnification. That is, a color moving image or a color still image with a desired magnification corresponding to the driving signal or the image signal input to the liquid crystal panels 25a to 25c is projected onto the screen.

Although the invention has been described with reference to the embodiments, the invention is not limited to the embodiments, but may be modified in various forms without departing from the gist of the invention. For example, the invention may be modified as follows.

Figure 8:
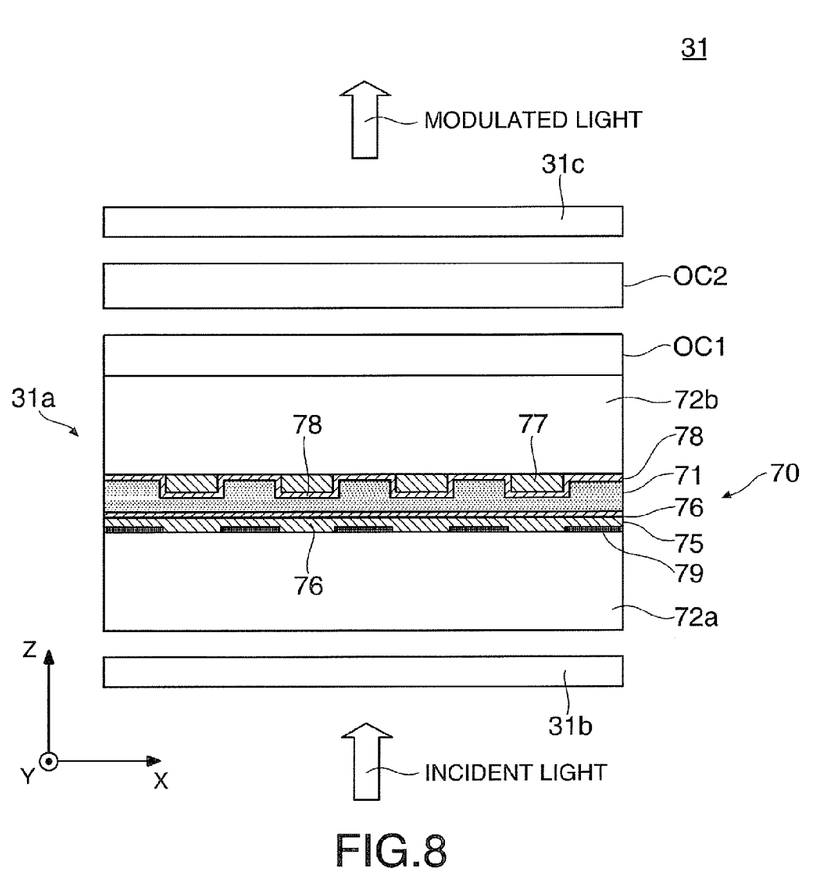
FIG. 8 is a side sectional view illustrating a modified example of the liquid crystal light valve shown in FIG. 1.

That is, although it has been described in the above-mentioned embodiments that the first and second optical compensating plates OC1 and OC2 are disposed apart from the liquid crystal cell 70, the first optical compensating plate OC1 may be bonded to the substrate 72b of the polarizing unit 31a using a transparent adhesive (see FIG. 8).

Figure 9:
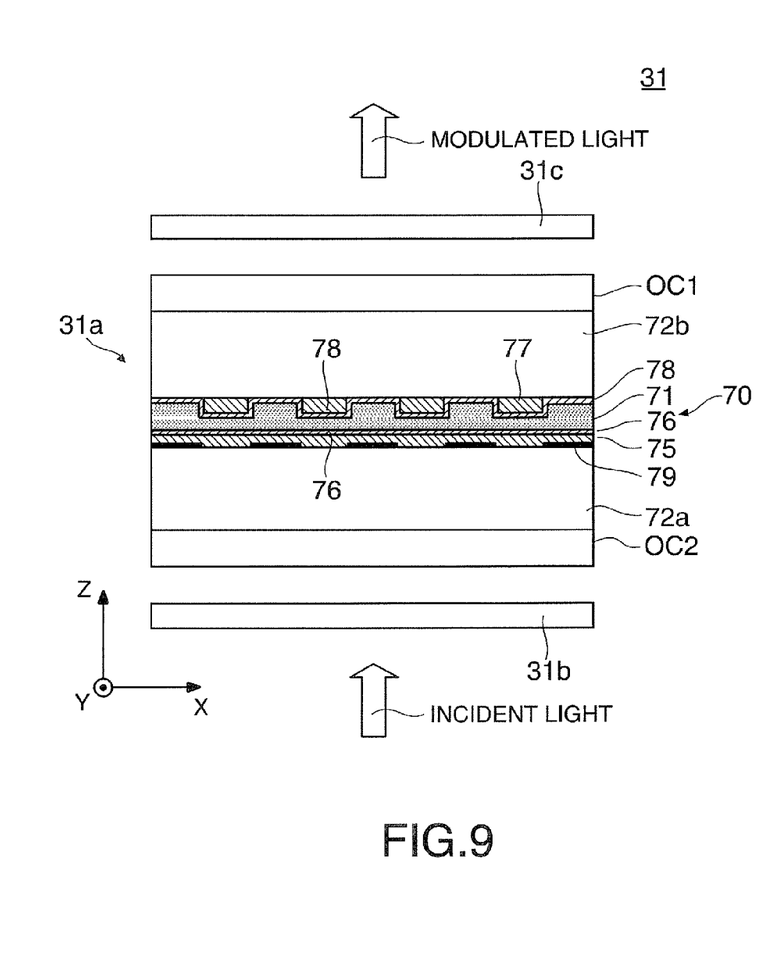
FIG. 9 is a side sectional view illustrating another modified example of the liquid crystal light valve shown in FIG. 1.

Although the first and second optical compensating plates OC1 and OC2 have been disposed between the liquid crystal cell 70 and the second polarizing filter 31c in the above-mentioned embodiments, the optical compensating plates OC1 and OC2 may be disposed between the liquid crystal cell 70 and the first polarizing filter 31b. The first and second optical compensating plates OC1 and OC2 may be disposed separately on the incidence side and the emission side of the liquid crystal cell 70. In this case, for example, a pair of optical compensating plates OC1 and OC2 may be bonded to a pair of substrates 72b and 72a forming the emission surface and the incidence surface of the polarization converting unit 31a (see FIG. 9).

In the liquid crystal cell 70 according to the above-mentioned embodiments, a micro lens array including micro lenses may be buried in the first substrate 72a, etc., to correspond to the pixels. However, since the enlargement angles of the beam passing through the liquid crystal cell 70 and the first and second optical compensating plates OC1 and OC2 coincide with each other, it is preferable that the first and second optical compensating plates OC1 and OC2 are disposed at a stage subsequent to the liquid crystal cell 70.

Although the light source unit 21 of the projector 10 according to the above-mentioned embodiment includes the light source lamp 21a, a pair of lens arrays 21d and 21e, the polarization converting member 21g, and the overlap lens 21i, the lens arrays 21d and 21e and the polarization converting member 21g may be omitted and the light source lamp 21a may be replaced with other light sources such as LED.

In the above-mentioned embodiment, the light beam is separated in color by the use of the color-separating optical system 23, the color beams are modulated by the use of the light modulating unit 25, and the color image beams are synthesized by the use of the cross dichroic prism 27. However, an image may be formed by the use of a single liquid crystal panel, that is, a single liquid crystal light valve 31.

Although the projector 10 employing three liquid crystal panels 25a to 25c has been exemplified in the above-mentioned embodiment, the invention may be applied to a projector employing two liquid crystal panels or four or more liquid crystal panels.

Although a front type project for projecting light in a direction in which a screen is observed has been exemplified in the abovementioned embodiment, the invention may be applied to a rear type projector for projecting light in the opposite direction of the direction in which a screen is observed.

The entire disclosure of Japanese Patent Application No. 2007-215638, filed Aug. 22, 2007 is expressly incorporated by reference herein.

What is claimed is:

1. A liquid crystal display device comprising:
    a liquid crystal cell including liquid crystal operating in a twisted nematic mode;
    a first quartz plate optically compensating for the liquid crystal cell;
    a second quartz plate optically compensating for the liquid crystal cell; and
    a pair of polarizing elements disposed with the liquid crystal cell, the first quartz plate, and the second quartz plate interposed therebetween,
    wherein the thickness d [μm] of the first and second quartz plates, the polar angle θ [°] of the optical axis of the first and second quartz plates, and the cell gap CG [μm] of the liquid crystal cell satisfy the following conditional expressions:

$$0.7(16\cos^2\theta - 23.6\cos\theta + 14.6)(1+0.32(CG-3.0)) < d \quad (1)$$

$$d < 1.3(16\cos^2\theta - 23.6\cos\theta + 14.6)(1+0.32(CG-3.0)) \quad (2).$$

2. The liquid crystal display device according to claim 1, wherein when the polar angel of the optical axis of the first and second quartz plates is in the range of 45° to 65° and the cell gap of the liquid crystal cell is in the range of 2.5 to 3.5 μm, the thickness d of the first and second quartz plates is in the range of 3.5 to 11.3 μm.

3. A projector comprising:
    the liquid crystal display device for light modulation according to claim 1;
    a lighting device lighting the liquid crystal display device; and
    a projection lens projecting an image formed by the liquid crystal display device.

4. The projector according to claim 3, wherein when the polar angel of the optical axis of the first and second quartz plates is in the range of 45° to 65° and the cell gap of the liquid crystal cell is in the range of 2.5 to 3.5 μm, the thickness d of the first and second quartz plates is in the range of 3.5 to 11.3 μm.

* * * * *